United States Patent [19]

Nakajima

[11] Patent Number: 4,727,651

[45] Date of Patent: Mar. 1, 1988

[54] CHAIN SAW

[75] Inventor: Kazuo Nakajima, Tokorozawa, Japan

[73] Assignee: Komatsu Zenoah Co., Tokyo, Japan

[21] Appl. No.: 815,732

[22] Filed: Jan. 2, 1986

[30] Foreign Application Priority Data

Jan. 8, 1985 [JP] Japan ........................ 60-000403
Mar. 19, 1985 [JP] Japan ..................... 60-038208[U]

[51] Int. Cl.[4] ........................ B23D 57/02

[52] U.S. Cl. ........................ 30/383; 181/214; 181/229

[58] Field of Search ........................ 30/383–387; 181/229, 222, 214

[56] References Cited

U.S. PATENT DOCUMENTS

| | | | |
|---|---|---|---|
| 352,373 | 8/1970 | Kobayashi | 143/32 |
| 3,204,619 | 9/1965 | Rubinowitz et al. | 181/229 X |
| 3,678,973 | 7/1972 | Loop | 143/32 |
| 3,680,608 | 8/1972 | Emmerich et al. | 30/383 |
| 3,800,910 | 4/1974 | Rose | 181/279 |
| 3,881,452 | 5/1975 | Dilworth et al. | 123/1 A |
| 3,994,067 | 11/1976 | Hazzard et al. | 30/383 |
| 4,198,752 | 4/1980 | Bross | 30/381 |
| 4,370,809 | 2/1983 | Takashashi et al. | 30/381 |
| 4,393,589 | 7/1983 | Barkhult | 30/381 |
| 4,508,068 | 4/1985 | Tuggle et al. | 123/187.5 R |

FOREIGN PATENT DOCUMENTS

| | | | |
|---|---|---|---|
| 157861 | 7/1954 | Australia | 30/383 |
| 2759844 | 7/1978 | Fed. Rep. of Germany | 30/383 |

*Primary Examiner*—Douglas D. Watts
*Attorney, Agent, or Firm*—Helfgott & Karas

[57] ABSTRACT

The device is an air intake apparatus for a chain saw. There is a hollow main casing having front and rear ends. A handle extends above the casing. The handle is fixed to the casing. An engine is disposed in the casing. A carburator is disposed in the casing front adjacent to a fuel tank. An oil tank is disposed at the casing rear.

6 Claims, 6 Drawing Figures

CHAIN SAW

DETAILED DESCRIPTION OF THE INVENTION

1. Field of the Invention

This invention relates to a chain saw and in particular to a chain saw for cutting trees etc. by rotating a saw chain around a guide bar which protrudes out from the front of the main casing of the chain saw being driven by the engine. Also this invention relates to the engine air intake apparatus which is housed inside the main casing of a chain saw engine etc.

2. Description of the Related Art

In reducing the size of and making the conventional chain saw more compact, the cylinder was placed behind the crank case and this horizontal shaped engine was housed inside of the main casing. Disposed on the top of this main casing is an upper handle which run in a front-to-rear direction of the casing. Above the front end of the crank case is located the carburetor housing, and below the front of the crank case is the fuel tank. Underneath the cylinder is located the oil tank. Because the oil or lubricant tank is located underneath the cylinder the height of the whole chain saw could not be reduced.

Also formerly, in the engine air intake apparatus of this kind of engine, the main casing housing the engine is partitioned to form a carburetor housing in which the air intake opening of the carburater is opened. This carburetor housing is exposed to the air by way of a filter. Since the air intake noise produced inside the engine is directly discharged through the filter, the air intake is noisy.

In this invention the oil tank is located behind the cylinder. Because the oil tank is not located underneath the cylinder the overall height is reduced. Also because the oil tank is installed so as to effectively use the space below the rear end of the upper handle and behind the cylinder of the former chain saw, the whole casing of the chain saw is made more compact without an increase in size.

In this invention an air intake passage is made through the outer wall of the carburetor. Placed inside of the cover which surrounds the outside of this passage is a muffler housing which is exposed to the air. The air intake noise of the engine is damped by passing through the air intake passage and muffler housing and the noise is reduced.

Generally, the length from front to back of the chain saw main casing is reduced and made more compact, however, the length of the upper handle, in order for the operator to be able to have a firm grip when handling the saw, a prescribed length is necessary. In conventional chain saws, the end of this upper handle is protruded from the rear of the main casing.

Figure 1:
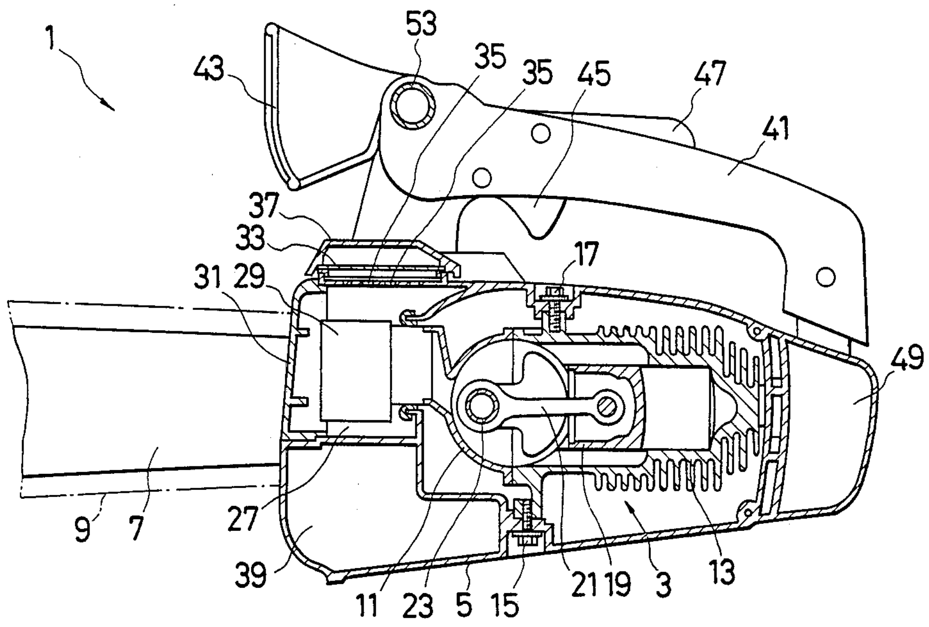
FIG. 1 is a vercial cross sectional view of an example of the application of this invention.
Figure 2:
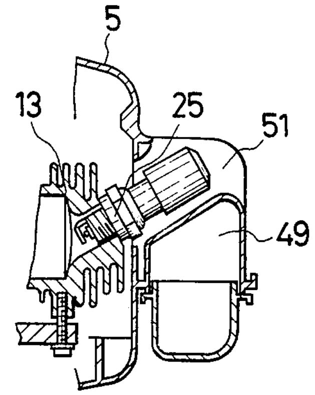
FIG. 2 is a cross sectional view of the main parts concerned.

Chain saw 1 is shown in the drawings. At the front of main casing 5 which houses engine 3 protrudes guide bar 7. Saw chain 9 is slidably located around guide bar 7 and rotated by the drive of engine 3. Crank case 11 of engine 3 and cylinder 13 fixed to crank case 11 are fixed to main casing 5 by bolts 15 and 17 facing toward the rear in a horizontal position. Piston 19 is slidably fitted into cylinder 13. Rod 21 links piston 19 to crank pin 23. Spark plug 25 is located at the end of cylinder 13. Carburetor housing 27 is arranged inside of main casing 5 in front of and above crank case 11. Placed inside of carburetor housing 27 is carburetor 29 which is communicated with crank case 11. Provided in front of carburetor housing 27 is cover 31 which freely opens and closes. Communicated with carburetor housing 27 through holes 35 is filter 33 which is supported and fixed by cover 37 which is opened to the air. Underneath the front of crank case 11 inside of main casing 5 is fuel tank 39. On the top surface of main casing 5 is upper handle 41, both ends of which are connected to main casing 5. Handle 41 is provided with protector 43 and throttle lever 45 on the underneath surface of handle 41, and on the top surface of handle 41, stopper lever 47 which engages throttle lever 45. Provided behind cylinder 13 inside main casing 5 is oil or lubricant tank 49 which stores the oil supplied to the movable parts of chain 9. Oil tank 49 is located below the rear end of upper handle 41 and is made with a depression 51 so as not to interfere with, in other words receive spark plug 25. Disposed at the front portion of upper handle 41 is side handle 53, which points to the side then bends downward and is fixed to main casing 5.

In the above application example, the operator grips the chain saw by the upper handle 41 and side handle 53 and uses the saw to cut trees etc. by way of saw chain 9 which rotates around guide bar 7 being driven by engine 3.

This embodiment as stated previously is made to use effectively the space behind the cylinder and below the rear end of the upper handle, making the chain saw smaller and more compact.

Figure 3:
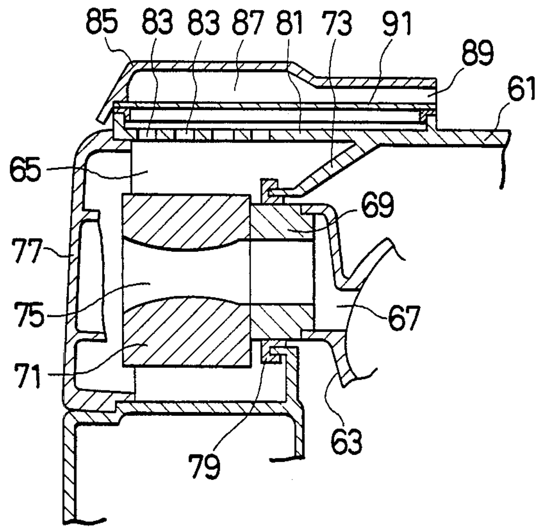
FIG. 3 is a cross sectional view of another example of the application of this invention.

As shown in FIG. 3, engine 63 is housed in main casing 61 of the chain saw. Main casing 61 is partitioned to form carburetor housing 65. Mounted inside of carburetor housing 65 is carburetor 71 which is connected to air intake opening 67 of engine 63 by way of intermediate adiabator 69. Carburetor 71 penetrates inner wall 73 and air intake opening 75 of carburetor 71 is opened. Opening of carburetor housing 65 can be closed by cover 77. The gap between carburetor 71 and inner wall 73 of carburetor housing 65 is sealed by seal 79. Air intake passage 83 penetrates outer wall 81 of carburetor housing 65. To air intake passage 83 on the outside thereof is attached detachable cover 85. On the inside of the passage is muffler housing 87. Muffler housing 87 is opened to the air by way of opening 89 which has a small cross sectional area. Muffler housing 87 is partitioned by filter 91.

In the above construction, air passes through opening 89 of muffler housing 87, air intake passage 83, and carburetor housing 65. Then from air intake opening 75 it passes through carburetor 71 and is mixed with the fuel. From air intake opening 65 it is drawn into engine 63. The air intake noise produced inside of engine 63 is muffled as it passes through air intake passage 83. Also it is muffled by opening 89 and the inner wall of muffler housing 87. This construction is different from the conventional apparatus in which the cover which supports the filter is located on the outside with the air passage inside the cover.

Figure 4:
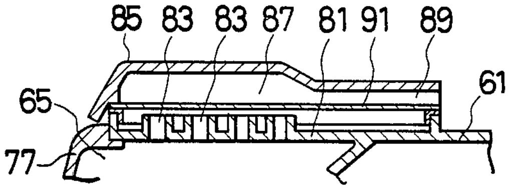
FIG. 4, FIG. 5, and FIG. 6 are cross sectional views of another examples of an application of this invention.
Figure 5:
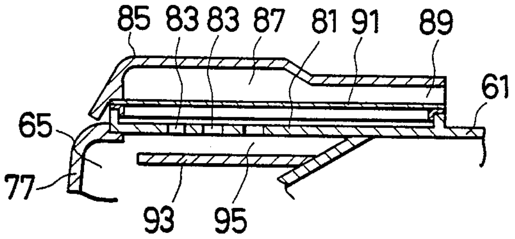
Figure 6:
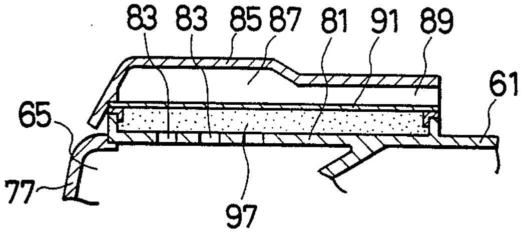

FIG. 4 shows another example. Because air intake passage 83 is slender and long, the muffling of the noise is improved. FIG. 5 shows still another example. Inside of air intake passage 83 is a second muffler housing 85 made up of interference wall 83 which further interferes with and muffled the noise. FIG. 6 shows another example. The muffling of the noise is improved by a sponge type porous member 97 inside of muffler housing 87.

These embodiments as stated previously improves the muffling of air intake noise of the engine.

This invention is not limited to the examples stated above, but may be applied in other conditions. Also the markings shown in the claims do not restrict the technical limits of the inevention.

What is claimed is:

1. A chain saw comprising:

a hollow main casing having a front end and a rear end;

an upper handle disposed above the main casing and extending longitudinally therealong, said handle being secured to the casing adjacent the front and rear ends thereof;

an engine disposed removably in the main casing, said engine being provided with a crank case, a cylinder, and an ignition plug, said cylinder extending horizontally toward the rear end, the plug being disposed at the end of the cylinder;

a carburetor housing disposed in front of the crank case adjacent the front end of the main casing;

a fuel tank disposed in front of the crank case adjacent the front end of the main casing and located underneath the carburetor; and a lubrication tank disposed between the cylinder and the rear end of the main casing, said lubrication tank having a recessed portion in which said plug is positioned.

2. Air intake apparatus for use with an engine of a chain saw comprising:

a hollow casing having a partition disposed adjacent but spaced from an outer wall, the space between the partition and the outer wall constituting a chamber, the remaining space constituting the main portion of the casing, the engine being disposed in the main portion;

a carburetor mounted on the engine, said carburetor having an air intake opening, said intake opening opening in the chamber whereby the chamber constitutes a carburetor chamber;

the outer wall having a plurality of air intake apertures therein which constitute an air intake passage;

an outer cover covering the outside of the air intake passage and having a narrowed air inlet opening to the ambient air; and a muffler disposed in the cover and connected between the air inlet opening and the air intake passage whereby air passes through the inlet opening, the muffler, the intake passage, the chamber and the air intake opening into the carburetor.

3. The apparatus of claim 2 further including an air filter disposed in the muffler.

4. The apparatus of claim 2 wherein each of the air intake apertures is elongated.

5. The apparatus of claim 2 further including a wall disposed in the chamber for reducing noise.

6. The apparatus of claim 2 wherein a sponge type porous body is disposed in the muffler.

* * * * *